US006772205B1

(12) United States Patent
Lavian et al.

(10) Patent No.: US 6,772,205 B1
(45) Date of Patent: Aug. 3, 2004

(54) EXECUTING APPLICATIONS ON A TARGET NETWORK DEVICE USING A PROXY NETWORK DEVICE

(75) Inventors: Tal Isaac Lavian, Sunnyvale, CA (US); Robert James Duncan, San Francisco, CA (US)

(73) Assignee: Nortel Networks Limited, Quebec (CA)

( * ) Notice: Subject to any disclaimer, the term of this patent is extended or adjusted under 35 U.S.C. 154(b) by 489 days.

(21) Appl. No.: 09/634,046

(22) Filed: Aug. 8, 2000

Related U.S. Application Data

(63) Continuation-in-part of application No. 09/522,332, filed on Mar. 9, 2000, now Pat. No. 6,012,404.
(60) Provisional application No. 60/124,047, filed on Mar. 12, 1999.

(51) Int. Cl.[7] ............................................. G06F 15/173
(52) U.S. Cl. ....................... 709/223; 709/217; 709/235; 370/254; 370/466
(58) Field of Search ................................. 709/223, 224, 709/217, 219, 235; 370/254, 466

(56) References Cited

U.S. PATENT DOCUMENTS

| | | | | | |
|---|---|---|---|---|---|
| 5,911,776 | A | * | 6/1999 | Guck ........................... | 709/217 |
| 5,961,595 | A | * | 10/1999 | Kawagoe et al. ............ | 709/223 |
| 6,055,243 | A | * | 4/2000 | Vincent et al. ............... | 370/466 |
| 6,058,103 | A | * | 5/2000 | Henderson et al. ........... | 370/254 |
| 6,292,829 | B1 | * | 9/2001 | Huang et al. ................. | 709/223 |
| 6,330,601 | B1 | * | 12/2001 | French et al. ................ | 709/223 |
| 6,487,590 | B1 | * | 11/2002 | Foley et al. .................. | 709/223 |

FOREIGN PATENT DOCUMENTS

| | | | | |
|---|---|---|---|---|
| EP | 0 831 617 | * | 3/1998 | ............ H04L/12/24 |

OTHER PUBLICATIONS

Susilo et al; "Infrastructure for Advanced Network Management based on Mobile Code." 1998, IEEE, pp. 322–333.*
Liotta et al; "Modelling Network and System Monitoring Over the Internet with Mobile Agents." 1998, IEEE, pp. 303–312.*
Covaci et al; "Java–based Intelligent Mobile Agents for Open System Management." 1997, IEEE, pp. 492–501.*
Covaci et al., "Java–Based Intelligent Mobile Agents for Open System Management," IEEE International Conference on Tools with Artificial Intelligence, U.S. Los Alamitos, CA: IEEE Computer Society, Nov. 3, 1997, pp. 492–501.
International Search Report, dated Aug. 17, 2000, in PCT/US00/06479.
Liotta et al., "Modeling Network and System Monitoring Over the Internet with Mobile Agents," IEEE Network Operations and Management Symposium, U.S. New York, NY: IEEE, vol. Conf. 10, Feb. 15, 1998, pp. 303–312.
Susilo et al., "Infrastructure for Advanced Network Management Based on Mobile Code," IEEE Network Operations and Management Symposium, U.S. New York, NY: IEEE, vol. Conf. 10, Feb. 15, 1998, pp. 322–333.

* cited by examiner

Primary Examiner—David Wiley
Assistant Examiner—Alina Boutah
(74) Attorney, Agent, or Firm—Fish & Richardson P.C.

(57) ABSTRACT

A method processes an object-oriented application on a target network device, by identifying a proxy network device capable of processing the object-oriented application, transmitting the object-oriented application to the proxy network device, generating one or more non-object-oriented instructions using the proxy network device corresponding to the object-oriented application, and transmitting the non-object-oriented instructions generated using the proxy network device to the target network device for processing. A system for processing an object-oriented application is also provided and includes a target network device capable of processing non-object-oriented instructions and sending information across a network, a proxy network device capable of processing the object-oriented instructions of the object-oriented application and converting the object-oriented instructions into non-object oriented instructions that the target network device can process, and a network that transmits the non-object oriented instructions from the proxy network device to the target network device to generate information that corresponds to results generated by the object-oriented application.

22 Claims, 8 Drawing Sheets

EXECUTING APPLICATIONS ON A TARGET NETWORK DEVICE USING A PROXY NETWORK DEVICE

This application is a continuation-in-part and claims priority from U.S. application No. 09/522,332, entitled METHOD AND APPARATUS FOR ACCESSING NETWORK INFORMATION ON A NETWORK DEVICE, filed Mar. 9, 2000, which claims the benefit of Provisioal application Ser. No. 60/124,047, filed Mar. 12, 1999.

TECHNICAL FIELD

This invention generally relates to using software applications in network management.

BACKGROUND

Computer networks are becoming increasingly complex and difficult to manage. This is driven in part by the ever-increasing variety of network devices, computers, and software being combined together to integrate large enterprise-based intranets with the Internet. Network management tools have been produced to monitor these complex combinations of hardware and software and help troubleshoot network failures when they occur.

Traditional network management tools use a protocol called simple network management protocol (SNMP) to monitor network devices such as routers, switches, hubs, remote access devices, or even computers in a network. The protocol used to interface with SNMP includes rudimentary commands to operate on data such as to "get" a variable, "set" a variable, or "test" a variable.

Having just a few simple commands make it difficult to perform network management tasks. Specifically, it can be difficult using these basic commands to develop sophisticated network management applications to monitor and troubleshoot a network. Each task may need to be customized to the parameters and capabilities of each network device. Further, a network management task sending combinations of these commands to one or more network devices connected to the network may wait a significant period of time for all the necessary results to be returned. Network delays can be caused by network congestion and the unique processing bottlenecks associated with each network device.

Improvements to the SNMP network management language must remain compatible with legacy network devices and the versions of SNMP used on these network devices. Unfortunately, it is difficult to greatly improve SNMP or other network management languages without rendering legacy network devices incompatible with the resulting upgraded systems.

SUMMARY

In one aspect of the present invention, a method processes an object-oriented application on a target network device, by identifying a proxy network device capable of processing the object-oriented application, transmitting the object-oriented application to the proxy network device, generating one or more non-object-oriented instructions using the proxy network device corresponding to the object-oriented application, and transmitting the non-object-oriented instructions generated using the proxy network device to the target network device for processing.

In another aspect of the invention, a system for processing an object-oriented application capable of performing one or more operations, includes a target network device capable of processing non-object-oriented instructions and sending information across a network, a proxy network device capable of processing the object-oriented instructions of the object-oriented application and converting the object-oriented instructions into non-object oriented instructions that the target network device can process, and a network that transmits the non-object oriented instructions from the proxy network device to the target network device to generate information that corresponds to results generated by the object-oriented application.

The details of one or more embodiments of the invention are set forth in the accompanying drawings and the description below. Other features and objects of the invention will be apparent from the description and drawings, and from the claims.

DESCRIPTION OF DRAWINGS

The accompanying drawings, which:are incorporated in and constitute a part of this specification, illustrate an embodiment of the invention and, together with the description, serve to explain principles of the invention.

DETAILED DESCRIPTION

Systems and methods described herein are used execute object-oriented applications on a network device that does not have object-oriented processing capabilities. To do this, a first network device capable of processing object-oriented applications receives the object-oriented application and corresponding instructions and converts them to non-object oriented instructions such as commands from the Simple Network Management Protocol or SNMP. The SNMP commands are then sent to a second network device capable of processing SNMP or other non-object oriented instructions but not object-oriented instructions. Because the second network device receives SNMP or non-object-oriented commands, the second network device can process the application without having object-oriented processing capabilities.

Figure 1:
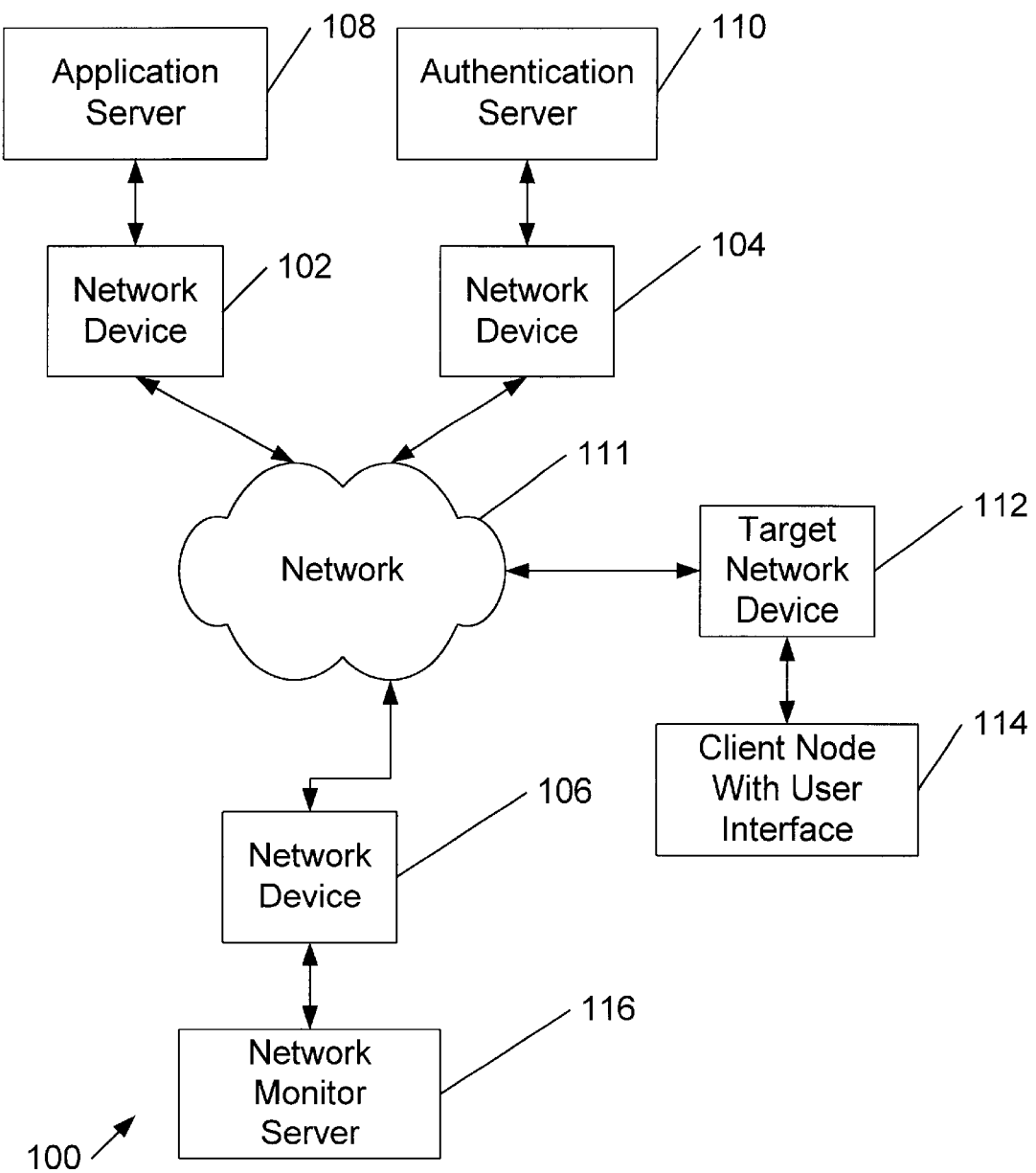
FIG. 1 is a block diagram of an example network.

FIG. 1 illustrates an example communication system 100 including a network device 102, a network device 104, a network device 106, and a target network device 112. Network devices 102, 104, 106, and target network device 112 includes switches, routers, hubs, and similar devices capable of processing fixed-length or variable-length packets in a network.

Network device 102 facilitates the transfer of applications from an application server 108 to the other network devices and nodes on the network. Server 108 provides applications that can execute directly on network devices 102–106 and target network device 112. The variety of network applications available for downloading from application server 108 increases the network management capabilities of each network device. For example, application server 108 may provide an application to a network device that enables the device to filter network traffic containing data packets generated from activities not critical to business, such as browsing the Internet. The resulting increase in bandwidth can be used for more critical business needs.

Network device 104 enables authentication server 110 to authenticate downloading of applications from application server 108 to other network devices within communication system 100. Authentication server 10 can identify a network device on the network and determine if that device should or should not receive a particular application. For example, authentication server 110 may authenticate a particular application and determine if the application should be downloaded to a network device in communication system 100. This feature could be used to prevent introduction of viruses or other unauthorized software onto the network. Additionally, authentication server 110 may also determine if a network device within communication system 100 has proper authorization to download an application.

Network device 106 facilitates communication between a network monitor server (NMS) 116 and other network nodes and processes within communication system 100. Traditionally, an NMS will send network commands to the network devices and, in return, receive input from the network devices, including network parameters. This traditional approach to network management requires NMS 116 to perform a majority of the processing for network management. In contrast, system 100 distributes processing to the network devices that are in communication with the network. This reduces the processing load and frees up NMS 116 so that it can process more critical tasks. For example, network device 102 may monitor network traffic between it and network 111 to reduce the processing load on NMS server 116. In such a case, NMS 116 might receive a notification from network device 102 when device 102 detects that the network bandwidth has exceeded a predetermined threshold.

Target network device 112 depicts an example network device monitored by either a user or central NMS 116. The client node user interface 114 allows the user to perform network management tasks that execute directly on target network device 112. NMS 116 is used to monitor larger and more frequent management tasks dealing with groups of network devices or the overall network. For example, NMS server 116 can execute software agents on different network devices and monitor overall traffic being processed by a group of network devices connected to the network.

Figure 2:
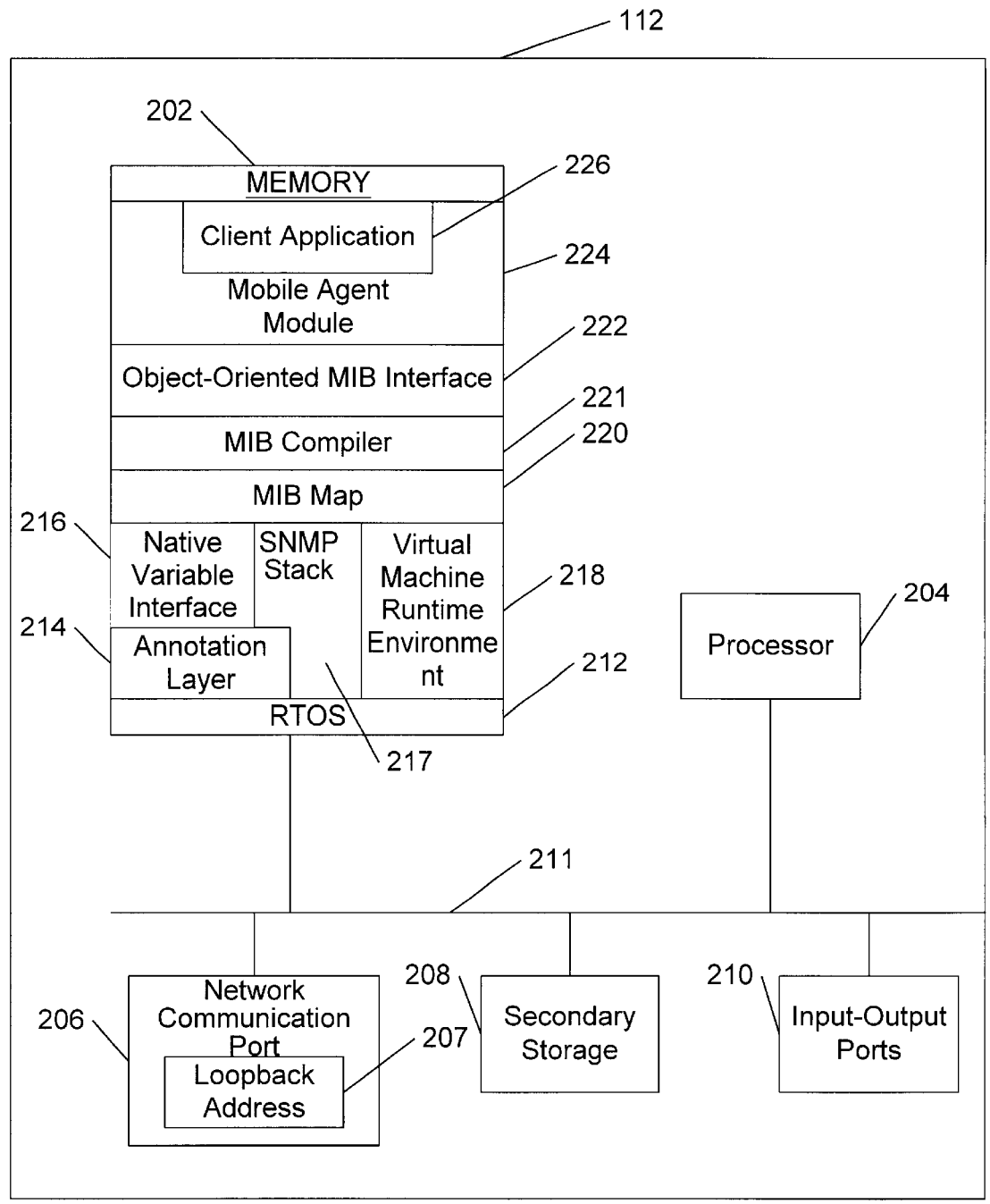
FIG. 2 is a block diagram example of a network device architecture.

FIG. 2 illustrates an architecture used, for example, on target network device 112 and compatible with the network management system. In this example, target network device 112 includes a memory 202, a processor 204, a network communication port 206, a secondary storage 208, and input-output ports 210 in communication with each other over a bus 211. Although the example architecture depicted in FIG. 2 includes specific components, alternate embodiments can be implemented using additional or fewer components than used in this example while remaining compatible with the network management system. The specific components used in the architecture for target network device 112 can vary depending on the specific functions to be performed and design decisions made for the particular implementation.

Network communication port 206 is compatible with a variety of physical and logical network protocols including, for example, TCP/IP and Novell NetWare. A loop back address 207 enables network management applications executing on target device 112 to access local storage areas and resources using the local network protocol stack and local network parameters rather than accessing the storage area on the network device directly. By using the network protocol stack, network applications can access network parameters on a local device and a remote device in a uniform manner. For example, a network management application executing on target network device 112 can access network parameters associated with a remote network device or a local network device through network communication port 206 by specifying either the network address of the remote network device or the local device respectively. Specifically, the network management application executing on the local device can access network parameters of the local network device by specifying loop back address 207. In effect, loop back address 207 provides indirect access to the network parameters of the local device through the network protocol stack.

Secondary storage 208 may include a disk drive, CD-ROM, or any other storage device used by target network device 112. Input-output ports 210 include physical connections for terminals, printers, pointing devices, keyboards, or any other device useful for configuring, operating, or controlling target network device 112.

During execution of one embodiment, modules in memory 202 include a real time operating system (RTOS) 212, an annotation layer 214, a native variable interface 216, a simple network management protocol (SNMP) stack 217, a virtual machine runtime environment 218, a management information database (MIB) map 220, a MIB compiler 221, an object-oriented MIB interface 222, a mobile agent module 224, and a client application 226. Alternate embodiments of the invention can include additional or fewer modules depending on the specific functions required for operation and the design decisions made to implement the invention. For example, RTOS 212 provides improved performance on target network device 112 by executing instructions as they arrive without interruption or delay. However, if the design allows for a reasonable delay while processes are preempted and swapped out of memory, then a general-purpose operating system may be used in lieu of RTOS 212. The general-purpose operating system may also be used if it is less costly to implement than the real-time system and compatible with a wider variety of existing software packages.

Annotation layer 214 provides an interface between applications accessing the MIB database associated with a network device and the actual storage locations for the MIB database on the network device. This layer is necessary because different hardware devices tend to store the underlying MIB database information in different locations on the network device. For example, one network device may store port speed address in a central lookup table of RAM while other network devices may store the port speed addresses for each port on separate ASIC chips associated with each port. Using annotation layer 214, an application can request MIB database information without specifying the actual location of data on the network device.

SNMP stack 217 implements a network management protocol used by different networks to exchange network management information while monitoring network communication. Typically, SNMP stack 217 exchanges network information with other nodes on the network through messages called protocol data units (PDUs). The PDUs contain variables with titles and values and are generally capable of "getting" network parameters, "setting" network parameters, or "testing" for network events occurring on network devices. For example, SNMP stack 217 may transmits a PDU to a remote network device to determine if the remote device has a terminal attached to it. If the terminal is attached to the remote network device, SNMP stack 217 will receive back a PDU containing information that may identify and describe the specific terminal. Each PDU typically includes a variable title and a value of the variable.

Native variable interface 216 provides direct access to underlying SNMP data stored on a network device. Each device on the network requires a different native variable interface 216 customized to the specific features of the device hardware and software. As new network devices are produced or added to a network, a new interface 216 is customized to the specific hardware and software requirements. While this customization process increases the research and development costs, it also increases the efficiency associated with retrieving network parameters from a network device because the information is accessed directly.

Alternatively, network parameters may also be retrieved using SNMP stack 217 and loopback address 207. This eliminates the need for native variable interface 216 and reduces the corresponding costs associated with developing the native variable interface. In lieu of accessing the network parameters directly, a network management application submits requests to loopback address 207 of a network device. Within the requests are SNMP compatible commands formulated to retrieve the desired network parameters. Local processes on the network device monitoring loopback address 207 pass the request to SNMP stack 217 which, in turn, accesses the network parameters as requested. The same local processes then return the resulting network parameters back through SNMP stack 217 and through loopback address 207 and back to the network management application requesting the information.

Virtual machine runtime environment 218 processes object-oriented instructions for execution on processor 204, and may include a virtual machine (VM) and a corresponding development kit (DK) having object-oriented class libraries. The VM simulates a processor and executes on many different hardware platforms. Instructions from a variety of applications are interpreted by the VM and executed on processor 204. One virtual machine run time environment 218 includes a Java virtual machine (JVM) and the Java foundation classes. The Java virtual machine is one type of virtual machine that promotes platform independent computing using the Java programming language.

In operation, MIB map 220 facilitates converting object-oriented requests for MIB information into requests for network parameters either through SNMP stack 217 or native variable interface 216. MIB map 220 determines how network parameters in a MIB should be accessed for different types of network devices. For example, MIB map 220 can be implemented with a table that converts requests for network parameters through native variable interface 216 or SNMP stack 217 into a series of object-oriented method calls. The map includes a database listing the network parameters related to the management of a network device and a set of object-oriented methods for manipulating the network parameters. MIB map 220 maps requests for network parameters from a set of operations to access and manipulate the network parameters to a database having the actual network parameter information. Each request for a network parameter may invoke one or more object-oriented methods depending on the complexity associated with retrieving and processing the data.

If a new type of network device is added to the network, MIB map 220 will initially access the network parameters using SNMP stack 217 and loopback address 207 in the manner previously discussed. This allows a network management device to access network parameters on an SNMP compatible network device using existing SNMP features built into the network device. Once a native variable interface 216 is developed for the network device, MIB map 220 can be reconfigured to access network parameters through the faster and more efficient native variable interface 216.

Object-oriented MIB interface 222 provides an interface for applications to access MIB information using object-oriented classes and methods. Initially, a MIB compiler 221, discussed in further detail below, receives a list of MIB variables and generates the classes and method found in the object-oriented MIB interface 222. At least two types of variables—scalar variables and table variables—are accessible through object-oriented MIB interface 222. A scalar variable is a single variable with an identifier that identifies the variable and a value associated with the variable. If an application requests a scalar variable, object oriented MIB interface 222 returns an object-oriented instance of that scalar variable. For example, a network management application may request a scalar variable identifying the number of resent packets on the network device. Alternatively, object-oriented MIB interface 222 may request a table of information from the underlying SNMP layer. In response, the underlying SNMP layer would provide an object table and corresponding methods for accessing each of the entries within the table. As an example, one type of object table may include a list of network addresses associated with network devices in a subnet and methods for an application to manipulate the entries in such a table.

Mobile agent module 224 provides a framework for executing a variety of mobile agents. Client application 226 represents one such mobile agent application as illustrated in FIG. 2. Accordingly, mobile agent module 224 interfaces between the mobile agent and the underlying execution environment, thus allowing a mobile agent to operate on a variety of network devices and operating environments.

For example, mobile agent module 224 implemented in accordance with the Java Bean™ application-programming interface defines a portable, platform-neutral set of APIs for software components to communicate with each other in accordance with the Java Beans conventions. In addition, mobile agents implemented using Java Bean components are able to plug into other component architectures, such as Microsoft's COM/IDCOM/Active X architecture. In this capacity, mobile agent module 224 acts as a bridge between mobile agents developed using Java Beans and other component object models or component architectures. For example, mobile agent module 224 may receive Java instructions from client application 226 and convert them into instructions compatible with the COM/DCOM/Active X environment or alternatively, may convert these same Java instructions into byte codes to run on a virtual machine in virtual machine run time environment 218. It should be appreciated that client application 226 may be any type of network management application designed for execution on target network device 112.

Figure 3:
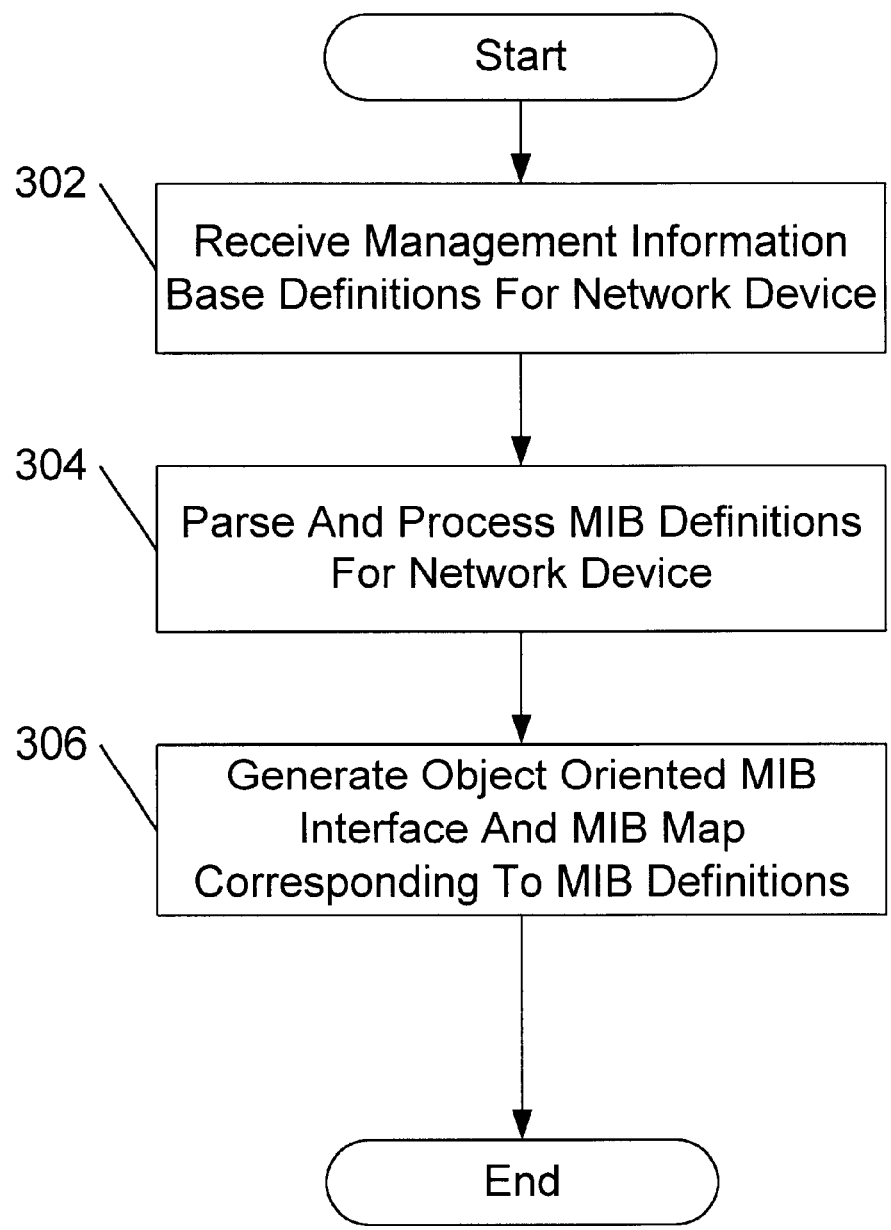
FIG. 3 illustrates the operations used in one embodiment to convert network parameters for a network device into an object-oriented compatible interface for accessing those network parameters.

FIG. 3 illustrates the operations for generating an interface to MIB information from an object-oriented application. MIB compiler 221 generates object-oriented MIB interface 222. Initially, MIB compiler 221 receives MIB definitions for a network device (302). These definitions may be stored in a database as a series of identifiers and corresponding values sufficient to describe the network parameters associated with a particular network device. Each network device may have a unique MIB definition depending on its capabilities and operating characteristics. Common MIB definitions, however, are arranged in a predetermined hierarchical order as illustrated in FIG. 4 and described below.

Next, MIB compiler 221 extracts network parameters for the specific network device from the MIB definitions (304). This involves lexically recognizing and parsing each token in the MIB definitions for the network device. MIB compiler 221 then generates an object-oriented MIB application-programming interface or MIB interface and MIB map 220 corresponding to the MIB definitions (306). The object-oriented MIB interface creates classes corresponding to the MIB hierarchy and methods for accessing each of the variables in the MIB definition. MIB map 220 assists in mapping object-oriented class definitions and method calls into corresponding combinations of SNMP primitives (e.g., get, set, and test) used by SNMP stack 217 or native variables.

Figure 4:
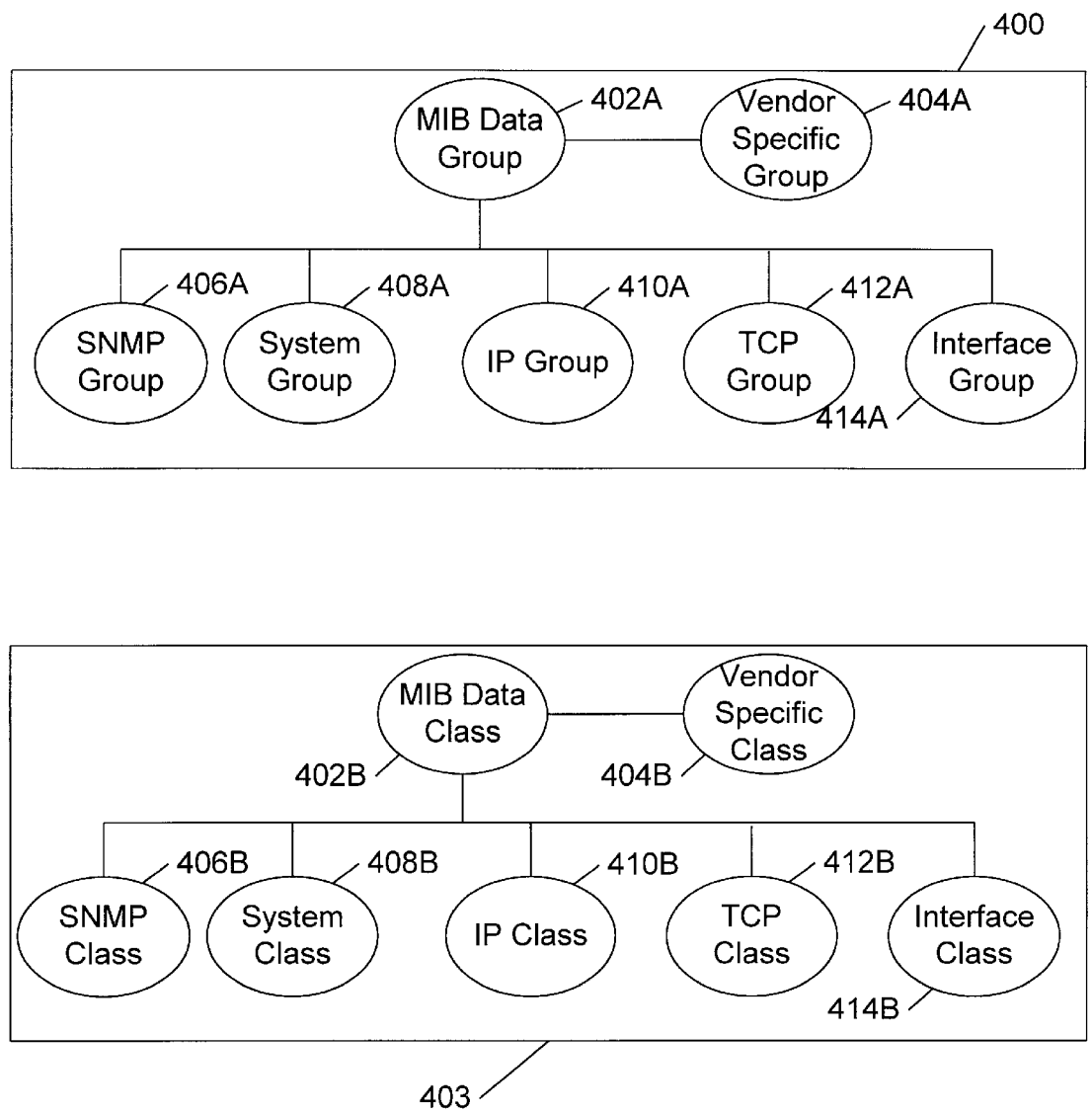
FIG. 4 depicts the relationship between a management information database (MIB) and the corresponding object-oriented MIB classes in one embodiment.

FIG. 4 illustrates an example mapping from MIB definitions 400 to corresponding MIB classes 403 and object-oriented methods. For example, MIB definitions 400 may include a MIB data group 402A, a vendor specific group 404A, an SNMP group 406A, a system group 408A, an IP group 410A, a TCP group 412A or an interface group 414A. These MIB information groups define how network information is organized and can be addressed on a network device. These specific groups contain network information organized according to industry standards.

For example, vendor specific group 404A includes an area that vendors can define their own network parameters and proprietary information. SNMP group 406A includes definitions for protocol data units (PDUS) used for network nodes to communicate. IP group 410A includes information corresponding to the network communication layer. For example, IP group 410A may include the IP address of a network device and nearby routers or switches. TCP group 412A, which includes information corresponding to the transport protocol layer, may include a list of all active connections communicating using a "socket" interface as well as the ports and corresponding services.

MIB compiler 221 in FIG. 2 receives the MIB definitions 400 in FIG. 4 in a database that lists the network parameters related to the management of a network device. MIB compiler 221 converts these MIB definitions 400 into corresponding MIB objects 403 including data class 402B, vendor's specific class 404B, SNMP class 406B, system class 408B, IP class 410B, TCP class 412B, and interface class 414B. Through this conversion, MIB compiler 221 then creates the methods an application can use to access network parameters in the MIB database corresponding to the classes.

In operation, an object-oriented network management application is downloaded into a network device accesses the MIB database through the object-oriented interface.

Figure 5:
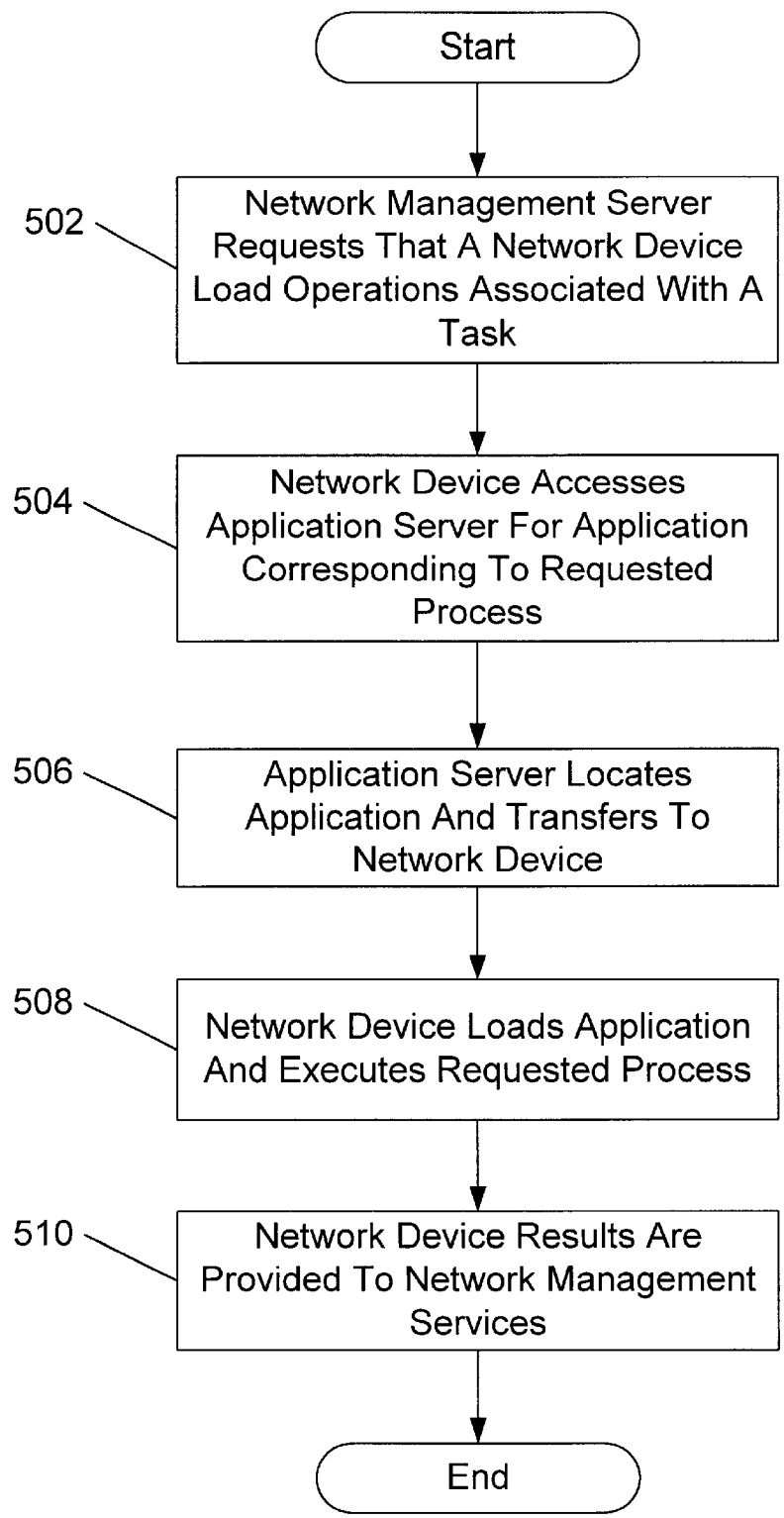
FIG. 5 illustrates the operations a network management server (NMS) performs to gather network parameters from a network device.

FIG. 5 illustrates the operations used by a NMS to manage a network device. Initially, the NMS requests that a network device load a set of operations associated with a particular task (step 502). This offloads a portion of the network management processing to the target network devices and frees up the NMS to handle other requests. In addition, this reduces network traffic caused by sending numerous PDUs with SNMP messages.

In response to the request to load a set of operations, the network device accesses an application server having the application(s) capable of performing the set of operations associated with the task (504). For example, an application server 108 as shown in FIG. 1 stores hundreds of network applications ready for execution on target network device 112. Application server 108 receives the request, locates the application, and then transfers it to the appropriate network device (506). In one implementation, application server 108 transfers a network application from application server 108 to the network device each time or session the network device executes the application. Alternatively, an application may remain resident in a network device permanently or for a given period of time once it is initially downloaded from the application server.

The network device loads and executes the requested application (508). Using the application, the network device may perform a variety of network management functions. For example, the network device may be asked to monitor network traffic on a nearby network and notify the central NMS when a node on the network becomes inactive or the network traffic increases beyond a particular threshold.

Once the information or results are generated, the network device provides information back to the NMS for processing (510). If a central NMS is not present, the network device may broadcast results over the network to other network devices monitoring and processing the network information.

Figure 6:
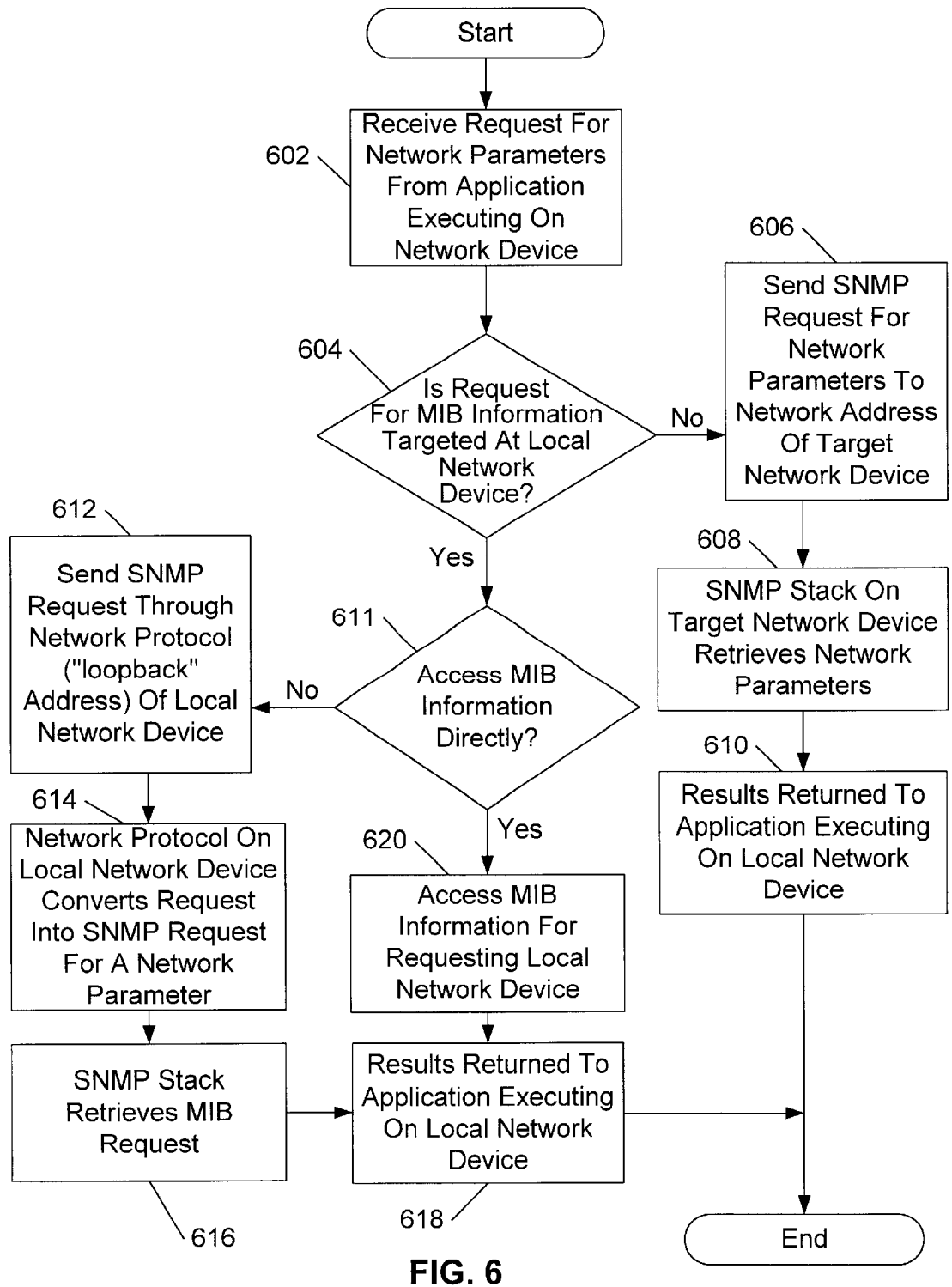
FIG. 6 illustrates the operations used by a network device to gather network parameters.

FIG. 6 illustrates the operations used to access network parameters on a network device consistent with the present invention. Specifically, a network management application such as client application 226 in FIG. 2 executes these operations to access network parameters stored directly on a local network device or to access network parameters stored on a remote network device. By accessing network parameters on a remote device, one network device can act as a proxy for obtaining network parameters from another network device. This is particularly useful if, for example, the remote network device is an older device or otherwise incompatible with features of the present invention. For example, a network management application executing on a local network device can be used to access parameters on a remote network device designed without a virtual machine or that is not capable of executing network management applications designed consistent with the present invention. The network management application can be an object-oriented application written in Java that uses remote method invocation (RMI), JINI, COM/DCOM or other distributed computing mechanisms to process information on a remote computer system. Java, RMI, JINI and derivatives of Java are trademarks of Sun Microsystems, Inc. of Mountain View, Calif. COM/DCOM are products developed by Microsoft of Redmond, Wash.

As shown in FIG. 6, a network management application initially begins execution on a local network device. The network management application executing on the local network device requests a network parameter typically found in the MIB (602). For example, a network management application may request MIB information corresponding to the current count and the cumulative count of packets being transmitted to determine if the capacity of a network device has been met or exceeded.

The network management application then determines if the requested network parameter is associated with the local network device or a remote network device (604). If the network parameter is associated with a remote network device, the network management application forms and sends a request for the network parameter to the remote network address of the network device (606). For example, the network management application may request that SNMP stack 217 (see FIG. 2) create a PDU to gather MIB information on the remote device. This request can be formed using an object-oriented programming language such as Java. SNMP stack 217 then transmits the request for a network parameter over the network to the remote network device for processing. A network protocol such as TCP/IP associated with that remote network device receives the request for the network parameter. The SNMP stack on the remote device processes the request and retrieves the requested network parameter, which includes MIB information (608). Once the network parameter is received on a remote network device, the corresponding SNMP stack packages the result into a PDU and sends the results back to SNMP stack 217 for processing by the network application executing on a local network device (610).

If the network management application requests network information associated with the local network device (604), the network management application can access the requested network parameters in at least two different ways. The network management application can access the network parameters on the local network device directly (611) using a software interface customized for the network device (620). For example, the network management application can use a native variable interface to access network parameters on the local network device.

Alternatively, the network management application may access local network parameters on a local network device using existing network protocol. Initially, the network management application sends a request for a network parameter through the network protocol of the local network device using the "loopback" address (612). This loopback address is a self-referential address which identifies the local network device on the network without sending packets of information over the actual network. For example, sending a request to the loop back address establishes a data route directly back to the network protocol stack on the local network device. The network management application essentially uses SNMP stack 217 on the local network device to create a PDU to request the corresponding network parameter (614). SNMP stack 217then retrieves the requests for the particular network parameter (616). The results are then returned to network management application 226 executing on local network device (618).

Figure 7:
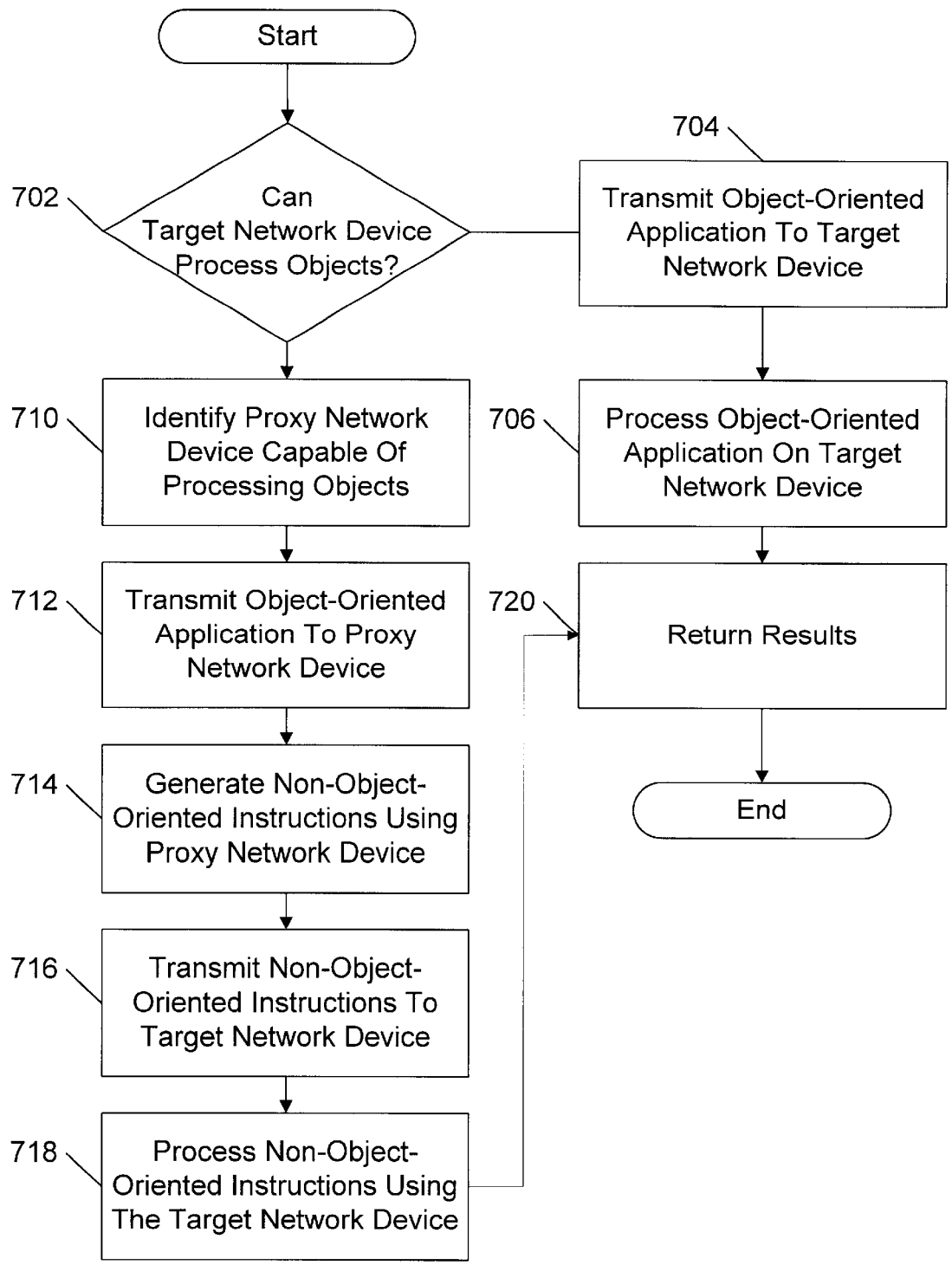
FIG. 7 is an example flowchart of the steps associated with processing an object-oriented application on a target device using a proxy network device.

FIG. 7 is an example flowchart of the steps associated with processing an object-oriented application on a target device using a proxy network device. Essentially, the proxy device converts the object-oriented application into instructions the target device can process such as SNMP commands. This process is useful, for example, when an object-oriented application must be executed on the target network device yet cannot rely on object-oriented processing capabilities that the target network device may have. Often this occurs when an existing legacy network device from another manufacturer is integrated with a network device having object-oriented capabilities. In contrast to the proxy network device, the legacy target network device cannot be relied upon to execute object-oriented applications as it may lack the components such as a Java virtual machine (JVM) or other subsystems necessary to process the objects. In addition, the legacy target network device is also generally incapable of directly executing other derivates of an object-oriented programming language such as Java Beans, JINI, and other programming derivates of the Java programming language.

Implementations of the present invention allows a variety of network devices to process object-oriented applications even though they may lack one or more components traditionally used to process object-oriented instructions. This is important because non-object oriented network devices from a variety of manufacturers can still work with object-oriented applications.

Accordingly, in FIG. 7 a determination is made whether a target network device is capable of processing objects and the corresponding object-oriented instructions on the target device (702). This determination can include accessing information stored in a data storage area describing certain features of both the target network device and a proxy network device. Searching and analyzing the information in the data storage area, determines whether the target network device can process object-oriented instructions or needs additional assistance in processing the object-oriented instructions using the proxy network device.

For example, a target network device and the proxy network device are used together to process object-oriented applications in "proxy mode" when the information in the storage area indicates that the target network device does not include a virtual machine for processing object-oriented instructions. Essentially, the proxy network device acts on behalf of the target network device because the target network device cannot always process object oriented instructions. In the Java programming language these object-oriented instructions are bytecodes and the proxy network device can be used to process these bytecode instructions in a manner described in further detail later herein The target network device may also require using the proxy network device to process object-oriented applications for numerous other reasons. For example, the target network device may offload processing of certain complex object-oriented instructions to the proxy network device. The target network device may also use the proxy network device if the target network device is incompatible with other types of network devices or applications on the network. A first network device designed by a first company may not be able to execute applications designed for a proxy network device designed by a second company. However, using the present invention, the proxy network device and the target network device are able to operate together on a network and execute the object-oriented applications.

Alternatively, if the target network device can process object-oriented applications, an NMS or other subsystem sends an object-oriented application directly to the target network device for processing (704). In this case, the target network device does not require the processing capabilities of the proxy network device as described above. Instead, the object-oriented application is processed on the target device (706) and the results returned to the NMS or subsystem requesting execution of the object-oriented application.

In the event the target network device cannot process the object-oriented applications, the proxy network device assists in the conversion and processing of objects into a format suitable for the target network device. Initially, a proxy network device capable of processing objects is identified on the network (710). In one implementation, the proxy network device includes systems for processing object-oriented applications and is within the same locale as the target network device. To process a Java-based application, the proxy network device includes a Java virtual machine or JVM.

The locale criteria used to select the proxy network device can depend on one or more characteristics or any combination of characteristics. For example, the characteristics can include measuring the relative geographic distance between the proxy network device and the target network device, comparing the load on different proxy network devices on the network and selecting the one with the least load, measuring and comparing the processor capabilities of a particular proxy network device against other proxy network devices, or any other selection criteria useful in measuring the processing capabilities of the proxy network device and determining how the proxy network device can be used efficiently and effectively.

To facilitate further processing, the target network device and the proxy network device are put in proxy mode for processing the object-oriented application. This proxy mode information is stored in a storage area on the proxy network device as well as the target network device. The target network device must be at least capable of processing non-object oriented network management commands such as SNMP. Information indicating that the target network device and the proxy network device should be in proxy mode for processing the object-oriented application can be based on a number of different types of information. For example, a target network device with a virtual machine for executing bytecodes may be capable of processing object-oriented applications written in a programming language such as Java, by Sun Microsystems, Inc. of Mountain View, Calif.

The NMS or other central system initially transmits the object-oriented application to the-proxy network device for pre-processing before it is sent on to the target network device. Specifically, the proxy network device generates one or more non-object-oriented network management commands corresponding to the object-oriented application using the proxy network device(714). This involves converting the instructions of an object-oriented program into the appropriate non-object oriented instructions using a lookup table and transmitting the non-object-oriented instructions generated by the proxy network device to the target network device for further processing (716). In one implementation, the instructions are converted from object-oriented instructions to non-object oriented instructions according to a lookup table listing equivalent object-oriented and non-object oriented instructions. Alternatively, object-oriented instructions can be converted to calls that invoke stored procedures in a database and execute a variety of non-object oriented instructions in conjunction with a database.

Once on the target network processor, the non-object oriented instructions are processed or executed (718). In one implementation, the non-object oriented instructions are SNMP compatible commands such as "get," "set," and "test" commands. The target network device generates results (720) by executing a combination of these commands and returns the results to the requesting NMS or requesting subsystem. If the results need to be in an object-oriented format, they can be converted into a data object by the proxy network device and returned to the NMS or subsystems as an object. This takes advantage of the non-object oriented SNMP processing capabilities presently available on the target network device while integrating newer functionality being provided by network devices capable of processing object-oriented applications.

Figure 8:
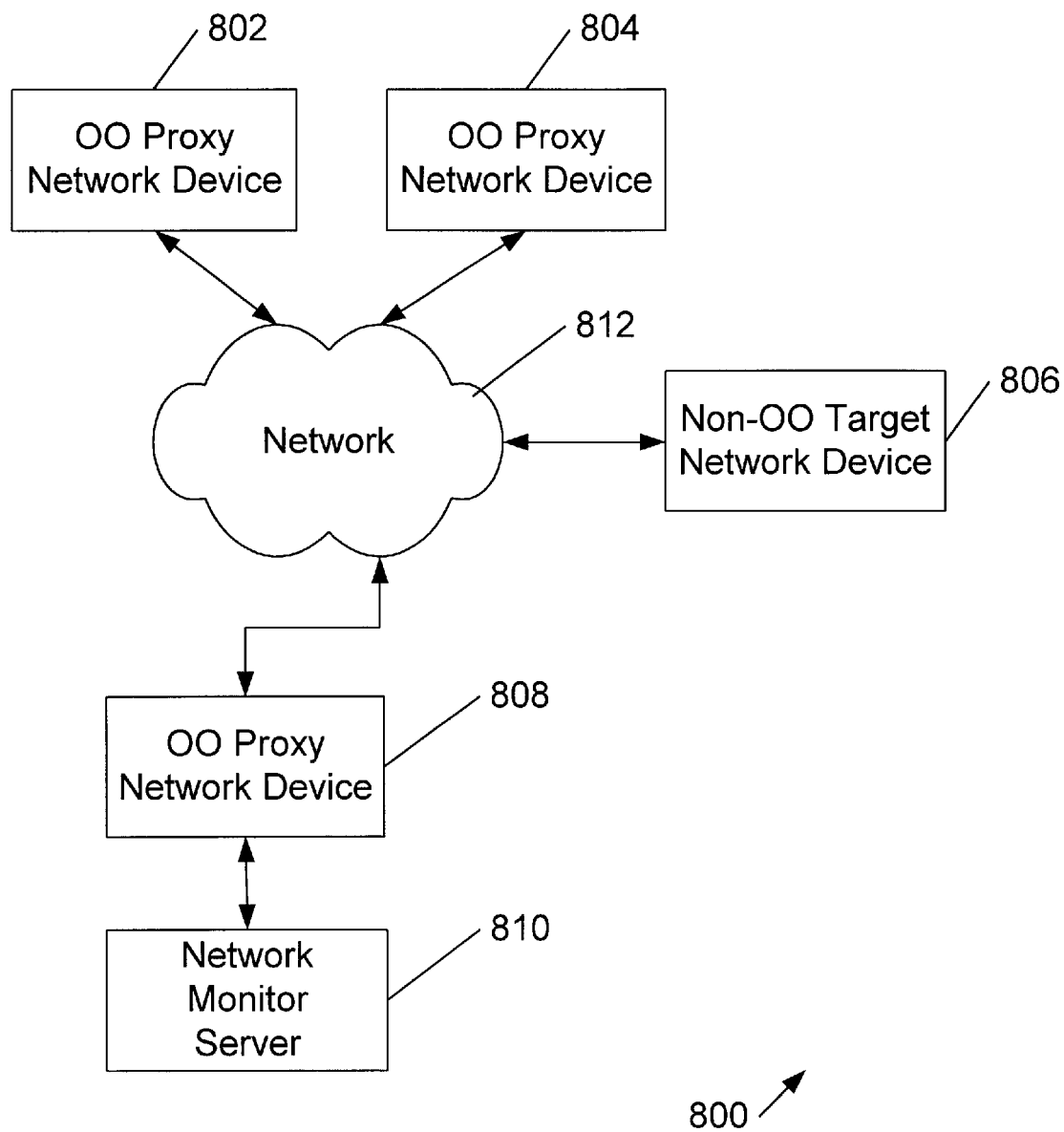
FIG. 8 is an example network system implementation consistent with at least one implementation of the present invention.

FIG. 8 is an example network system implementation consistent with at least one implementation of the present invention. System 800 includes an object-oriented proxy network device 802, an object-oriented proxy network device 804, a non-object-oriented target network device 806, an object-oriented proxy network device 808, and a network monitor server (NMS) 810.

Target network device 806 cannot process non-object-oriented instructions while any of the object-oriented proxy devices 802, 804, and 808 can assist target network device 806 by converting the object-oriented instructions into a network programming command language such as SNMP. For example, object-oriented proxy network device 804 can be selected to convert instructions from an object-oriented application into a set of SNMP compatible commands. Eventually, network monitor server 810 receives SNMP based commands for further processing.

While specific implementations have been described herein for purposes of illustration, various modifications may be made without departing from the spirit and scope of the invention. For example, although aspects of the present invention are described as being stored in memory and other storage mediums, they can also be stored on or read from other types of computer-readable media, such as secondary storage devices, like hard disks, floppy disks, or CD-ROM, a carrier wave from the Internet, or other forms of RAM or ROM. Accordingly, the invention is not limited to the above-described embodiments, but instead is defined by the appended claims and their full scope of equivalents.

What is claimed is:

1. A method of processing non-object oriented network management instructions on a target network device, the network management instruction being based on an object-oriented network management application, the method comprising:

performing network management processing with a network management server to determine use of network resources on one or more network devices connected to a network, the network management processing being based on an object-oriented network management application;

determining whether a target network device is capable of processing the object-oriented network management application, the target network device being among the one or more network devices, and if the target network device is not capable of processing the object-oriented network management application then, identifying a proxy network device capable of processing the object-oriented network management application, the proxy network device being among the one or more network devices connected to the network;

transmitting the object-oriented network management application to the proxy network device;

using the proxy network device to generate one or more non-object-oriented network management instructions corresponding to the object-oriented network management application; and transmitting the non-object-oriented network management instructions generated using the proxy network device from the proxy network device to the target network device for processing.

2. A method of processing non-object oriented network management instructions on a target network device, the network management instruction being based on an object-oriented network management application, the method comprising:

performing network management processing with a network management server to determine use of network resources on one or more network devices connected to a network, the network management processing being based on an object-oriented network management application;

transmitting a request from the network management server to a target network device for the target network device to load the object-oriented network management application and perform at least some of the network management processing, the target network device being among the one or more network devices connected to the network;

determining whether the target network device is capable of processing the object-oriented network management application, and if the target network device is capable of processing the object-oriented network management application then, transmitting the object-oriented network management application to the target network device for processing;

if the target network device is not capable of processing the object-oriented network management application then, identifying a proxy network device capable of processing the object-oriented network management application, the proxy network device being among the one or more network devices connected to the network;

transmitting the object-oriented network management application to the proxy network device;

using the proxy network device to generate one or more non-object-oriented network management instructions corresponding to the object-oriented network management application; and transmitting the non-object-oriented network management instructions generated using the proxy network device from the proxy network device to the target network device for processing.

3. The method of claim 2, wherein identifying a proxy network device capable of processing the object-oriented network management application includes selecting a proxy network device that is within a same locale criteria as the target network device.

4. The method of claim 3, wherein the local criteria is based on a relative geographic distance between the proxy network device and the target network device.

5. The method of claim 3, wherein the locale criteria is based on a measurement of processor capabilities of one or more proxy network devices.

6. The method of claim 3, wherein the locale criteria is based on a comparison of a load on one or more proxy network devices.

7. The method of claim 2, wherein determining whether the target network device is capable of processing the object-oriented network management application includes accessing information stored in a data storage area of the target network device, the information describing features of the target network device.

8. The method of claim 2, further comprising:

determining that the target network device and the proxy network device are in proxy mode for processing the object-oriented network management application and the target network device is at least capable of processing non-object oriented network management instructions commands.

9. The method of claim 8, wherein the determining further comprises:

providing a data storage area having information corresponding to the target network device and the proxy network device; and searching the information in the data storage area for information indicating that the target network device and the proxy network device should be in proxy mode for processing the object-oriented network management application.

10. The method of claim 8, wherein the non-object oriented network management instructions are compatible with simple network management protocol (SNMP) commands.

11. The method of claim 9, wherein the target network device and the proxy network device are set to proxy mode when the information in the data storage area indicates that the target network device does not include a virtual machine for processing object-oriented bytecodes.

12. The method of claim 11, wherein the object-oriented bytecodes are compatible with the Java programming language.

13. An apparatus for processing non-object oriented network management instructions on a target network device, the non-object oriented network management instructions being based on an object-oriented network management application, the apparatus comprising:

a network management server to determine use of network resources on one or more network devices connected to a network, the network management processing being based on an object-oriented network management application, the network management server having a processor; and a memory having instructions capable of executing on the processor that, transmit a request from the network management server to a target network device for the target network device to load the object-oriented network management application and perform at least some of the network management processing, the target network device being among the one or more network devices connected to the network;

determine whether the target network device is capable of processing the object-oriented network management application, and if the target network device is capable of processing the object-oriented network management application then, transmit the object-oriented network management application to the target network device for processing, if the target network device is not capable of processing the object-oriented network management application then, identify a proxy network device capable of processing the object-oriented network management application, the proxy network device being among the one or more network devices connected to the network, transmit the object-oriented network management application to the proxy network device, use the proxy network device to generate one or more non-object-oriented network management instructions corresponding to the object-oriented application, and transmit the non-object-oriented network management instructions generated by the proxy network device from the proxy network device to the target network device for processing.

14. The apparatus of claim 13, wherein the memory further includes additional instructions that, determine that the target network device and the proxy network device are in proxy mode for processing the object-oriented network management application and the target network device is at least capable of processing non-object oriented network management instructions.

15. The apparatus of claim 14, wherein the instructions used to determine that the target network device and the proxy network device are in proxy mode further include additional instructions that, provide information from a data storage area corresponding to the target network device and the proxy network device; and search the information in the data storage area for information indicating that the target network device and the proxy network device should be in proxy mode for processing the object-oriented network management application.

16. The apparatus of claim 14, wherein the non-object oriented network management commands instructions are compatible with simple network management protocol (SNMP) commands.

17. The apparatus of claim 15, wherein the target network device and the proxy network device are set to proxy mode when the information in the data storage area indicates that the target network device does not include a virtual machine for processing object-oriented bytecodes.

18. The apparatus of claim 17, wherein the object-oriented bytecodes are compatible with the Java programming language.

19. An apparatus for processing non-object oriented network management instructions on a target network device, the non-object oriented network management instructions being based on an object-oriented network management application, the apparatus comprising:

a module for performing network management processing with a network management server to determine use of network resources on one or more network devices connected to a network, the network management processing being based on an object-oriented network management application;

a module for transmitting a request from the network management server to a target network device for the target network device to load the object-oriented network management application and perform at least some of the network management processing, the target network device being among the one or more network devices connected to the network;

a module for determining whether the target network device is capable of processing the object-oriented network management application, and if the target network device is capable of processing the object-oriented network management application then, a module for transmitting the object-oriented network management application to the target network device for processing;

if the target network device is not capable of processing the object-oriented network management application then, module for identifying a proxy network device capable of processing the object-oriented network management application, the proxy network device being among the one or more network devices connected to the network;

a module for transmitting the object-oriented network management application to the proxy network device;

a module for using the proxy network device to generate one or more non-object-oriented network management instructions corresponding to the object-oriented network management application; and a module for transmitting the non-object-oriented network management instructions generated by the proxy network device from the proxy network device to the target network device for processing.

20. A computer program product, tangibly stored on a computer-readable medium, for processing non-object oriented network management instructions on a target network device, the non-object oriented network management instructions being based on an object-oriented network management application, the product comprising instructions operable to cause a programmable processor to:

perform network management processing with a network management server to determine use of network resources on one or more network devices connected to a network, the network management processing being based on an object-oriented network management application;

transmit a request from the network management server to a target network device for the target network device to load the object-oriented network management application and perform at least some of the network management processing, the target network device being among the one or more network devices connected to the network;

determine whether the target network device is capable of processing the object-oriented network management application, and if the target network device is capable of processing the object-oriented network management application then, transmit the object-oriented network management application to the target network device for processing;

if the target network device is not capable of processing the object-oriented network management application then, identify a proxy network device capable of processing the object-oriented network management application, the proxy network device being among the one or more network devices connected to the network;

transmit the object-oriented network management application to the proxy network device;

use the proxy network device to generate one or more non-object-oriented network management instructions corresponding to the object-oriented network management application; and transmit the non-object-oriented network management instructions generated by the proxy network device from the proxy network device to the target network device for processing.

21. An apparatus for processing non-object oriented network management instructions on a target network device, the non-object oriented network management instructions being based on an object-oriented network management application, the apparatus comprising:

means for performing network management processing with a network management server to determine use of network resources on one or more network devices connected to a network, the network management processing being based on an object-oriented network management application;

means for transmitting a request from the network management server to a target network device for the target network device to load the object-oriented network management application and perform at least some of the network management processing, the target network device being among the one or more network devices connected to the network;

means for determining whether the target network device is capable of processing the object-oriented network management application, and if the target network device is capable of processing the object-oriented network management application then,
means for transmitting the object-oriented network management application to the target network device for processing;

if the target network device is not capable of processing the object-oriented network management application then,
means for identifying a proxy network device capable of processing the object-oriented network management application, the proxy network device being among the one or more network devices connected to the network;
means for transmitting the object-oriented network management application to the proxy network device;
means for generating one or more non-object-oriented network management instructions using the proxy network device, the one or more non-object oriented network management instructions corresponding to the object-oriented network management application; and
means for transmitting the non-object-oriented network management instructions generated by the proxy network device from the proxy network device to the target network device for processing.

22. A system for processing an object-oriented network management application capable of performing one or more network management processing operations, comprising:

a network management server to determine use of network resources on one or more network devices connected to a network, the network management processing being based on an object-oriented network management application;

a target network device capable of processing non-object-oriented network management instructions and sending information across a network, the target network device being among the one or more network devices;

a proxy network device capable of processing object-oriented network management instructions of an object-oriented network management application and converting the object-oriented network management instructions into non-object oriented network management instructions that the target network device can process, the proxy network device being among the one or more network devices; and the network that transmits the non-object network management oriented instructions from the proxy network device to the target network device, the target network device to generate information that corresponds to results generated by the object-oriented network management application.

* * * * *